C. BATEMAN.
STONE SAWING MACHINE.
No. 106,308.             Patented Aug. 16, 1870.
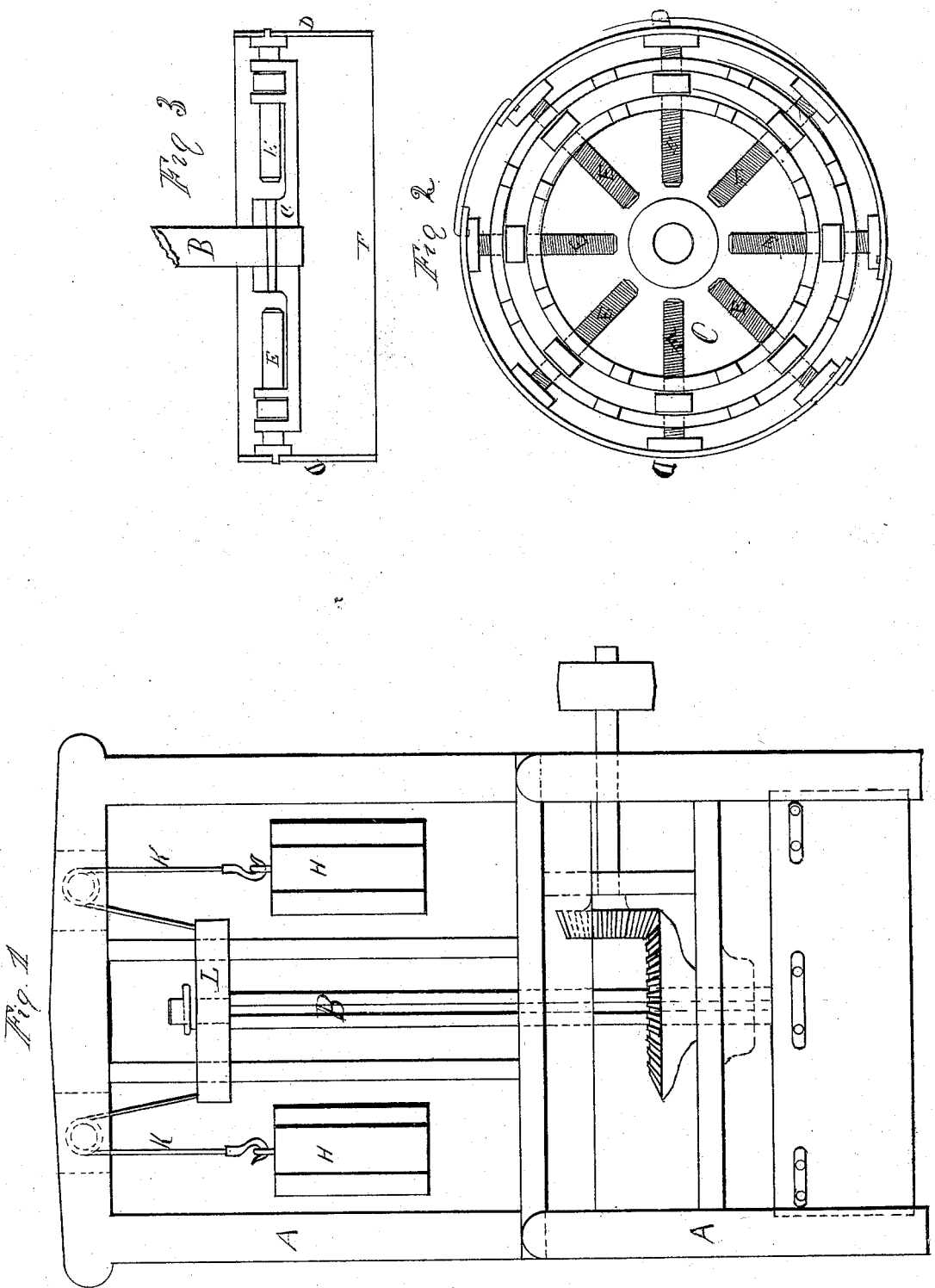

UNITED STATES PATENT OFFICE.

CHARLES BATEMAN, OF BALTIMORE, MARYLAND.

IMPROVED STONE-SAWING MACHINE.

Specification forming part of Letters Patent No. 106,308, dated August 16, 1870.

*To all whom it may concern:*

Be it known that I, CHARLES BATEMAN, of the city of Baltimore and State of Maryland, have invented certain Improvements in Machines for Sawing Stone, of which the following is a specification.

My invention relates to stone-sawing machines, by means of which blocks of marble and other stone may readily be sawed into annular or other curved shapes for building and other purposes, and provides a cheap, simple, and efficient method of producing from stone circular blocks, rings, solid and hollow cylinders at one and the same operation, or segments thereof for forming arches for doorways and windows, grindstones, &c.

The manner of constructing and operating my invention may be readily understood by reference to the accompanying drawings, which form a part of this specification.

A, Figure 1, represents a stout square framework, to which is arranged spindle B, with mechanism for rotating and otherwise operating the same.

Attached to the lower end of spindle B, and revolving with it, is disk or wheel C, constructed as in Fig. 2, with adjustable set-screws E E E E radiating from about its center through its periphery or rim. These radiating set-screws are for the purpose of expanding the disk, increasing its circumference, so that the one expansible disk may be adjusted to any desired size for the purpose of receiving a saw, in the manner hereinafter described. Arranged to the ends of these adjustable screws E E E E, somewhat after the manner that a felly is attached to the spokes of a carriage-wheel, is metal blade or saw D, with its lower or cutting edge, F, as seen in Fig. 3, so extended below the disk or wheel C as to form a hollow cutting-cylinder, beneath the edge of which the blocks of stone are placed when to be cut. The saw or blade D is attached to the radiating set-screws E E E E in segments or sections, as in Fig. 2, so as to admit of being adjusted to the cutting of any desired curve or circle.

Spindle B, Fig. 1, is constructed so as to slide and feed of its own weight through its gearing perpendicularly. By this means the saw or cutting-cylinder is adjusted, fed, and pressed to its work, the feeding-pressure being regulated by weights H H, attached to spindle B by cords K K and yoke L. Cords K K are also used for elevating the spindle and saw when the blocks of stone are to be placed and adjusted beneath them. This may be done either while the machine is at rest or in motion.

I do not confine myself to the use of a single saw placed in the form of a circle around a disk. When desirable, I use two or more saws or blades, placed in circles one beyond the other and attached to the set-screws, whose ends may be made to extend or radiate through the blades or saws placed upon them for the purpose of receiving other saws. By this arrangement I am enabled to saw a number of rings or circles at one operation.

I claim as my invention—

1. The construction and arrangement, substantially as described, of disk or wheel C, with set-screws E E E E for holding and adjusting the saw D, in the manner set forth, and for the purpose described.

2. The combination of spindle B, disk C, and saw D, substantially as and for the purpose herein set forth.

CHARLES BATEMAN.

Witnesses:
W. H. HAYWARD,
J. R. NIMMO.